(12) United States Patent
Laine et al.

(10) Patent No.: US 9,643,732 B2
(45) Date of Patent: May 9, 2017

(54) AIRCRAFT ATTITUDE INDICATOR DEVICE

(71) Applicant: Airbus Operations SAS, Toulouse (FR)

(72) Inventors: Franck Laine, Colomiers (FR); Olivier Sapin, Toulouse (FR); Charles Renault Leberquer, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 147 days.

(21) Appl. No.: 14/736,526

(22) Filed: Jun. 11, 2015

(65) Prior Publication Data

US 2017/0057656 A1    Mar. 2, 2017

(30) Foreign Application Priority Data

Jun. 12, 2014    (FR) ...................... 14 55339

(51) Int. Cl.
| | |
|---|---|
| G01C 21/00 | (2006.01) |
| B64D 43/02 | (2006.01) |
| G01C 21/18 | (2006.01) |
| G01C 19/44 | (2006.01) |
| G01C 21/16 | (2006.01) |

(52) U.S. Cl.
CPC ............. *B64D 43/02* (2013.01); *G01C 19/44* (2013.01); *G01C 21/16* (2013.01); *G01C 21/18* (2013.01)

(58) Field of Classification Search
CPC ........ B64D 43/02; G01C 19/44; G01C 21/16; G01C 21/18
USPC .......................... 340/974; 244/3.21; 702/151
See application file for complete search history.

(56) References Cited

U.S. PATENT DOCUMENTS

| 1,944,619 A | 1/1934 | Urfer | |
|---|---|---|---|
| 2,687,507 A | 8/1954 | Schonstedt | |
| 6,456,905 B2 * | 9/2002 | Katz | G01C 21/18 244/3.21 |
| 7,873,458 B2 * | 1/2011 | Todd | G01C 9/12 701/70 |

FOREIGN PATENT DOCUMENTS

GB    120 694 A    11/1918

OTHER PUBLICATIONS

Search Report FR 14 55339 dated Jan. 30, 2015.

* cited by examiner

*Primary Examiner* — John A Tweel, Jr.
(74) *Attorney, Agent, or Firm* — Lerner, David, Littenberg, Krumholz & Mentlik, LLP

(57) ABSTRACT

An aeroplane attitude indicator device includes a mobile rod which includes a first end connected by a link to a support fastened to the aeroplane and a second end to which is connected a moving body, at least one actuator for controlling the motions of the rod, and a system for piloting the at least one actuator as a function of information originating from an attitude detection system of the aeroplane, so as to orient the rod in a vertical direction. The assembly of rod and moving body correspond to a pendulum-like artifact. Also described is an aeroplane cockpit equipped with an attitude indicator device.

9 Claims, 3 Drawing Sheets

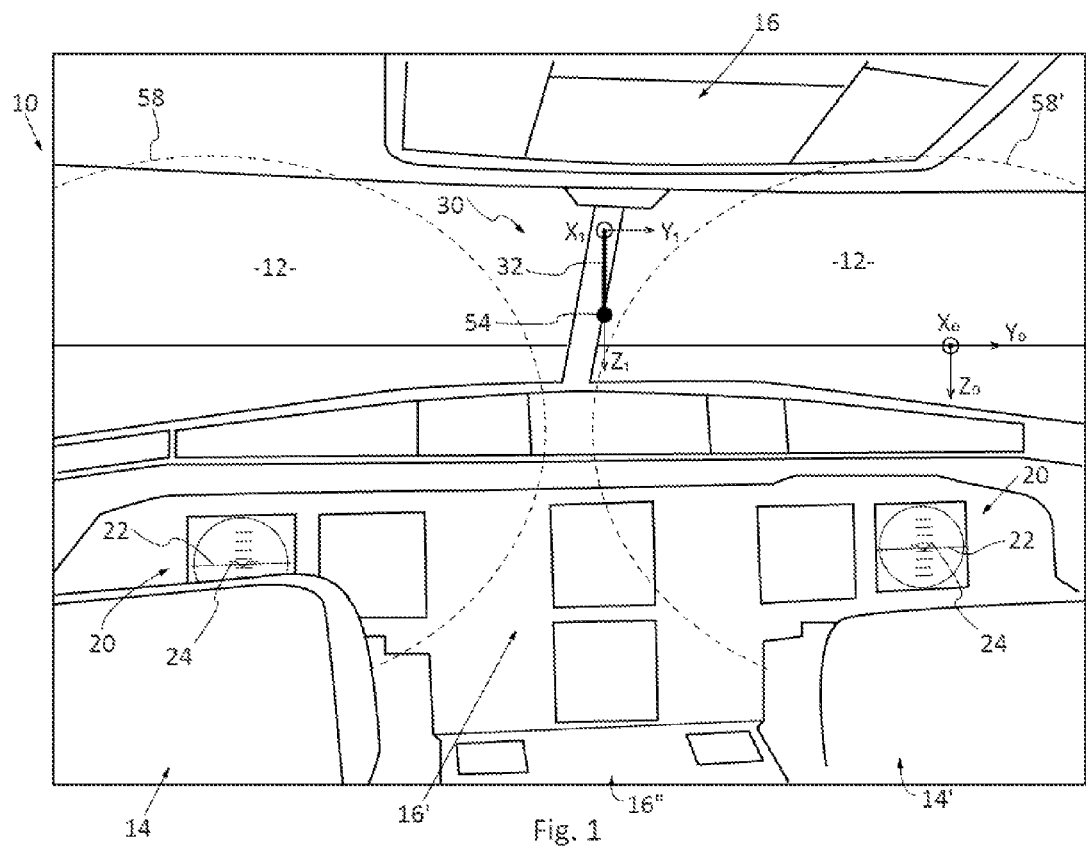
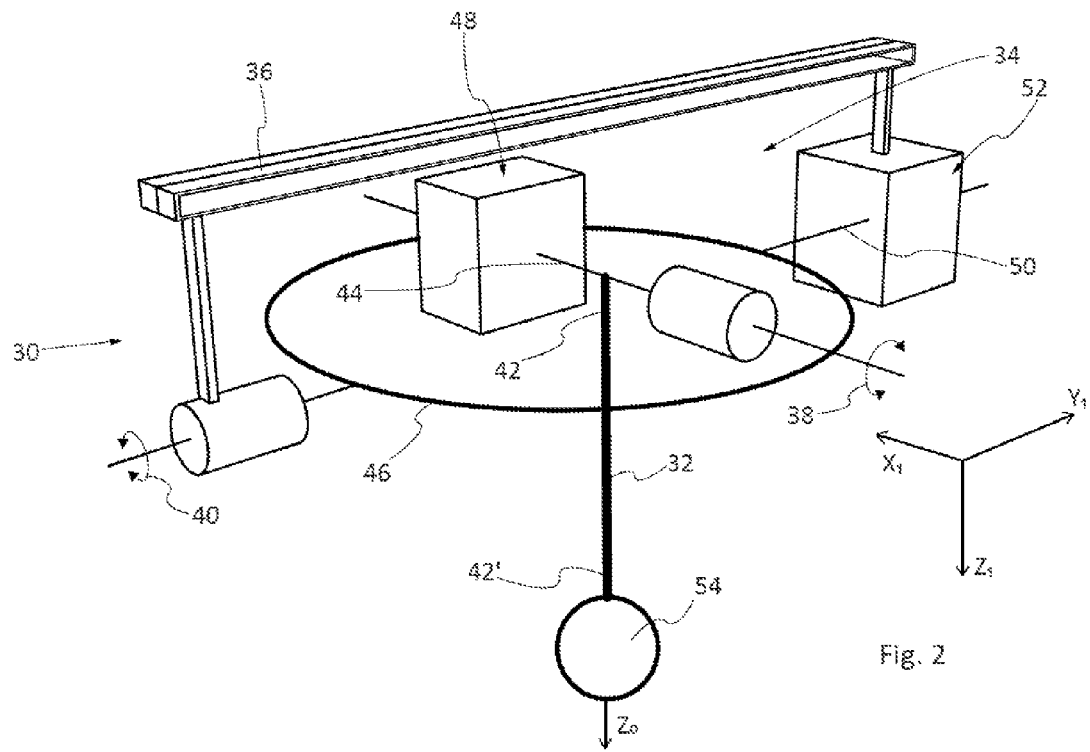

AIRCRAFT ATTITUDE INDICATOR DEVICE

FIELD OF THE INVENTION

The present invention pertains to an aircraft attitude indicator device.

BACKGROUND OF THE INVENTION

Hereinafter in this application, use is made of an earth frame of reference which comprises:

An axis $X_0$ which corresponds to a horizontal axis oriented northwards.

An axis $Y_0$ which is horizontal, perpendicular to the axis $X_0$ and oriented eastwards.

An axis $Z_0$ which is perpendicular to the axes $X_0$ and $Y_0$ and oriented downwards.

The axes $X_0$ and $Y_0$ define a horizontal plane and the axis $Z_0$ corresponds to the vertical direction.

To define the motions of an aeroplane, an aeroplane frame of reference is associated therewith, comprising:

An axis $X_1$ which extends from the rear tip to the front tip of the aeroplane and which is linked to the aeroplane, also called the aeroplane longitudinal axis $X_1$, An axis $Y_1$ which is perpendicular to the axis $X_1$ and which is oriented in the direction of the aerofoil of the aeroplane, also called the aeroplane transverse axis $Y_1$, An axis $Z_1$ which is perpendicular to the axes $X_1$ and $Y_1$ and oriented downwards.

With respect to the earth frame of reference, when the aeroplane pivots about the axis $Y_1$ (pitch), the angle $\theta$ between the aeroplane longitudinal axis $X_1$ and the horizontal plane is called the trim. When the aeroplane pivots about the axis $X_1$ (roll), the angle $\Phi$ between the aeroplane transverse axis $Y_1$ and the horizontal plane is called the bank.

The attitude of the aeroplane corresponds to the position of the aeroplane with respect to the horizontal plane and is characterized by the trim and the bank of the aeroplane.

The cockpit of an aircraft comprises an artificial horizon which indicates the attitude of the aeroplane. The artificial horizon is positioned in front of the pilot.

According to one embodiment, the artificial horizon takes the form of a screen on which is displayed information relating to the attitude of the aeroplane originating from a gyroscopic system and/or from an inertial platform. The screen comprises a blue upper part symbolizing the sky, a brownish lower part symbolizing the earth and an artificial horizon line separating the upper and lower parts. A schematic representation of the aeroplane is positioned with respect to this artificial horizon line as a function of the attitude of the aeroplane.

Despite this presentation of the information, the artificial horizon is perceived by pilots as an artificial aid, possibly prone to faults. In situations of stress, for example during the triggering of alarms, pilots may have a tendency to accord greater confidence, in respect of positioning in space, to their sensations rather than to the information transmitted to them by the aeroplane's instruments. It is nevertheless substantiated that, usually, the information given by the aeroplane's instruments is more reliable than pilots' sensations. Indeed, the absence of any exterior visual frame, the flight conditions and stress may impair the pilot's sensations and give rise to spatial disorientation. The loss of confidence, by the pilot, in the information given by the artificial horizon can then lead to situations of risk.

BRIEF SUMMARY OF THE INVENTION

Aspects of the invention are aimed at remedying the drawbacks of the prior art.

In particular, an aspect of the invention may limit the risks of spatial disorientation of the pilot, to prevent the pilot's sensations from being contradictory to the information which is given to him by the onboard instruments.

For this purpose, an embodiment of the invention is an aeroplane attitude indicator device, characterized in that it comprises:

a mobile rod which comprises a first end connected by a link to a support fastened to the aeroplane and a second end to which is connected a moving body, at least one actuator for controlling the motions of the rod, a system for piloting said at least one actuator as a function of information originating from an attitude detection system of the aeroplane, so as to orient the rod in a vertical direction, the assembly of rod and moving body corresponding to a pendulum-like artefact.

This aeroplane attitude indicator device makes it possible to corroborate the information provided by the artificial horizon and limits the risks of loss of confidence of the pilot.

Advantageously, the attitude indicator device comprises at least one luminous element with a luminous intensity and/or a colour which varies as a function of a signal, of an alarm or of a parameter of the aeroplane.

According to a variant, the rod is telescopic and the attitude indicator device comprises an actuator for controlling the length of the telescopic rod as a function of a parameter of the aeroplane.

Advantageously, the attitude indicator device comprises a cowling in the form of an aeroplane mockup.

According to one embodiment, the link between the rod and the support comprises:

a first pivoting axis parallel to an aeroplane longitudinal axis which pivots on itself with respect to an intermediate support, a first actuator which controls the pivoting motion of the first pivoting axis, a second pivoting axis parallel to an aeroplane transverse axis which pivots on itself with respect to the support, a second actuator which controls the pivoting motion of the second pivoting axis, the intermediate support being fastened to the second pivoting axis.

The subject of the invention is also an aeroplane cockpit which comprises an attitude indicator device positioned in a cockpit zone situated in a peripheral field of vision of a pilot who is installed in a piloting station and who is looking straight ahead.

BRIEF DESCRIPTION OF THE DRAWINGS

Other characteristics and advantages will emerge from the following description of the invention, which description is given solely by way of example, with regard to the appended drawings in which:

FIG. 1 is a partial view of an aeroplane cockpit equipped with an attitude indicator device which illustrates the invention, FIG. 2 is a schematic representation illustrating an embodiment of an attitude indicator device according to the invention.

DETAILED DESCRIPTION

According to a configuration illustrated in FIG. 1, a cockpit of an aeroplane 10 comprises a windscreen 12, two piloting stations 14, 14', a set of instrument panels 16, 16', 16" placed respectively above and below the windscreen 12 and between the two piloting stations, which comprise various onboard instruments such as viewing screens, controls, keyboards, etc. None of these elements is detailed further since they are known to the person skilled in the art. Moreover, the configurations of the cockpits vary from one model of aeroplane to another. In all cases, the cockpit of an aeroplane comprises at least one windscreen, at least one piloting station and at least one instrument panel.

Figure 3:
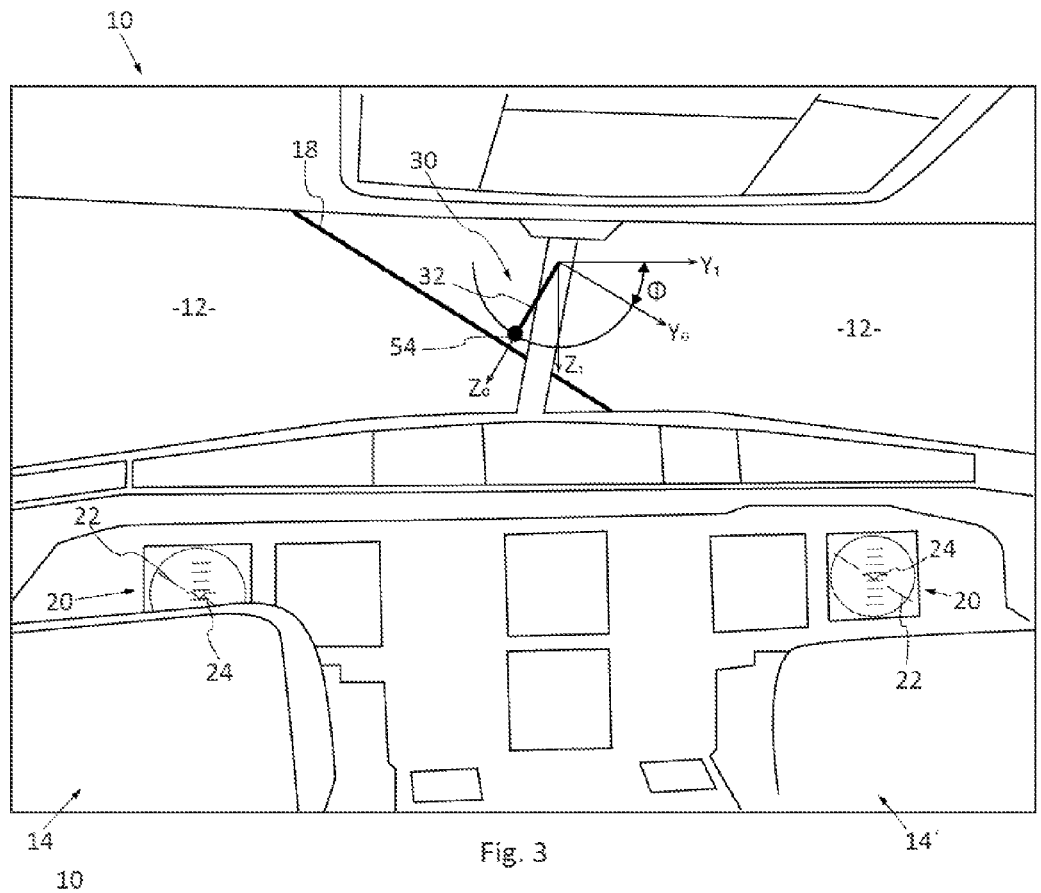
FIG. 3 is a partial view of an aeroplane cockpit equipped with an attitude indicator device when the aeroplane exhibits a non-zero bank.
Figure 4:
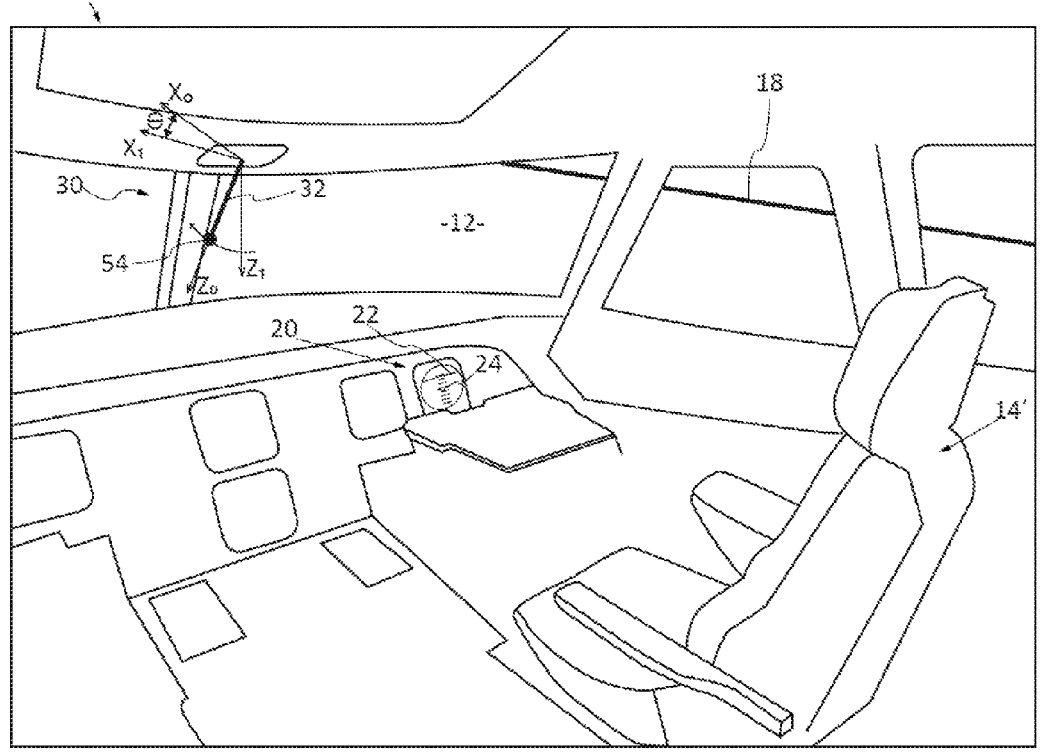
FIG. 4 is a partial view of an aeroplane cockpit equipped with an attitude indicator device when the aeroplane exhibits a non-zero trim.

In FIGS. 1, 3 and 4, a real horizon line 18 perceived through the windscreen 12 has been represented in the form of a continuous line.

Among all the onboard instruments, the cockpit comprises an artificial horizon 20 which indicates the attitude of the aeroplane. According to one embodiment, this artificial horizon 20 comprises a screen with a blue upper part symbolizing the sky, a brownish lower part symbolizing the earth, and an artificial horizon line 22 separating the upper and lower parts. The artificial horizon 20 also comprises a schematic representation of the aeroplane 24 whose position with respect to the artificial horizon line 22 is dependent on the attitude of the aeroplane.

The information presented by the artificial horizon 20 originates from a first attitude detection system of the aeroplane such as an inertial platform and/or a gyroscope for example, which collects information making it possible to define the relative position of the artificial horizon line 22 and of the schematic representation of the aeroplane 24.

The artificial horizon 20 and the first attitude detection system of the aeroplane are not described further since they are known to the person skilled in the art.

According to a configuration, the artificial horizon 20 is positioned in front of the piloting station below the windscreen 12.

The earth frame of reference $X_0$, $Y_0$, $Z_0$ has been represented in FIGS. 1 to 4, the axes $X_0$ and $Y_0$ corresponding to a horizontal plane and the axis $Z_0$ corresponding to the vertical direction.

The aeroplane frame of reference whose axes $X_1$, $Y_1$, $Z_1$ are linked to the structure of the aeroplane has also been represented.

According to the invention, the cockpit of the aeroplane 10 comprises an attitude indicator device 30 which gives an item of information relating to the attitude of the aeroplane in addition to that provided by the artificial horizon 20.

As illustrated in detail in FIG. 2, this attitude indicator device 30 comprises a mobile rod 32 connected by a link 34 to a support 36 fastened to the structure of the aeroplane. Thus, the support 36 is fixed with respect to the aeroplane frame of reference. The link 34 is configured to allow the rod 32 to perform a first pivoting motion 38 about the aeroplane longitudinal axis $X_1$ and a second pivoting motion 40 about the aeroplane transverse axis $Y_1$.

The attitude indicator device 30 also comprises at least one actuator which controls the pivoting motions 38, 40 of the rod 32.

According to one embodiment, the rod 32 is rigid and rectilinear. It comprises a first end 42 connected via the link 34 to the support 36 and a second end 42'.

According to one embodiment illustrated in FIG. 2, the link 34 comprises:
  a first pivoting axis 44 parallel to the aeroplane longitudinal axis $X_1$ which pivots on itself with respect to an intermediate support 46 and whose pivoting motion 38 is controlled by a first actuator 48,
  a second pivoting axis 50 parallel to the aeroplane transverse axis $Y_1$ which pivots on itself with respect to the support 36 and whose pivoting motion 40 is controlled by a second actuator 52,
  the intermediate support 46 being fastened to the second pivoting axis 50.

According to one embodiment, the support 36 is a clevis fastened to the structure of the aeroplane. As a variant, the support 36 is a part of the structure of the aeroplane.

According to one embodiment, the first and second actuators 48 and 52 are motor reduction gears whose outputs are linked respectively to the first and second pivoting axes 44 and 50.

The invention is not limited to this type of link between the rod 32 and the support 36, nor to actuators 48 and 52 of this type.

The attitude indicator device 30 also comprises a system for piloting the actuator or actuators 48 and 52 as a function of information originating from a second attitude detection system of the aeroplane such as an inertial platform and/or a gyroscope for example, so as to orient the rod 32 in a direction parallel to the $Z_0$ axis of the earth frame of reference. Thus, the rod 32 indicates the vertical direction.

According to the invention, the attitude indicator device 30 does not indicate the horizon as the artificial horizon 20 but the vertical direction, thereby making it possible to corroborate the information provided by the artificial horizon 20 and limiting the risks of loss of confidence of the pilot.

This attitude indicator device thus constitutes for the pilot a reference of the vertical direction, which is unconsciously interpreted by the pilot as constituting the true vertical direction. Thus, even if the pilot does not consciously consult this attitude indicator device, the fact that it is in his field of vision influences his sensations of balance and prevents him feeling the vertical direction in some direction other than that indicated by the attitude indicator device.

According to another aspect, the act of controlling the motion of the rod 32 and of not leaving it free in the manner of a pendulum makes it possible to avoid impairing the information relating to the vertical direction, because of the inertia forces originating from the accelerations.

In a preferential manner, the aeroplane comprises a single attitude detection system of the aeroplane which ensures the function of the first and second attitude detection systems of the aeroplane and makes it possible to control the artificial horizon 20 and the rod 32 of the attitude indicator device 30.

Represented in FIG. 3 is the aeroplane cockpit 10 equipped with an attitude indicator device 30 when the aeroplane is oriented northwards, exhibits a zero trim but exhibits a non-zero angle of bank, or of roll. In this case, the transverse axis $Y_1$ of the aeroplane forms with a horizontal plane, and in this instance with the axis $Y_0$ of the earth frame of reference, an angle $\Phi$ called the bank (or roll). In this situation, the rod 32 of the attitude indicator device 30 is oriented parallel to the $Z_0$ axis of the earth frame of reference and indicates the vertical. It is noted that the rod 32 is perpendicular to the real horizon line 18.

Represented in FIG. 4 is the aeroplane cockpit 10 equipped with an attitude indicator device 30 when the aeroplane is oriented northwards, exhibits a zero angle of bank but exhibits a non-zero trim. In this case, the longitudinal axis $X_1$ of the aeroplane forms with a horizontal plane, and in this instance with the axis $X_0$ of the earth frame of reference, an angle $\theta$ called the trim. In this situation, the rod 32 of the attitude indicator device 30 is oriented parallel to the $Z_0$ axis of the earth frame of reference and indicates the vertical.

Of course, the aeroplane may exhibit attitudes combining varied trims and banks. Whatever the combination of the trim and of the bank, the rod 32 of the attitude indicator device 30 is oriented in the vertical direction by virtue of the second attitude detection system of the aeroplane, the piloting system, the actuators 48 and 52 and the link 34.

Preferably, the attitude indicator device 30 comprises a moving body 54 fastened to the second end 42' of the rod 32. The shapes of the moving body 54 are chosen so as to make it possible to limit the risks of loss of confidence of the pilot. Advantageously, the moving body 54 is a sphere. The ratio between the diameter of the rod and the dimensions of the moving body 54, more particularly its diameter when the moving body 54 is a sphere, is determined in such a way that the assembly comprising the rod 32 and the moving body 54 resembles a pendulum and is perceived by the pilot or pilots as such.

By pendulum is understood any object resembling same, such as a plumb line or any other ballasted line.

Whatever the rod 32 and the moving body 54 are, they are configured in such a way as to resemble a pendulum. Thus, the rod/moving body assembly corresponds to an artefact, namely a product that has undergone a transformation (the control of its motion) and which resembles some other object (a pendulum) whose motion obeys natural forces, notably gravity, and unquestionably indicates the vertical direction. Thus, the shapes of the rod 32 and of the moving body 54 help to limit the risks of loss of confidence of the pilot.

Preferably, the attitude indicator device 30 comprises a cowling in which are disposed the link 34, the actuator or actuators 48, 52 and optionally the piloting system. Only the rod 32 and the moving body 54 are disposed outside the cowling.

Figure 6:
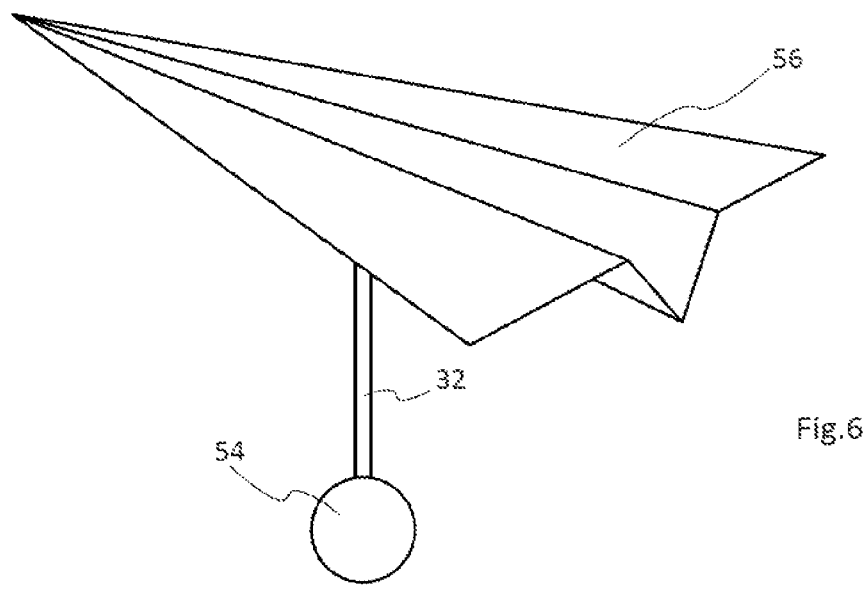
FIG. 6 is a schematic representation of an attitude indicator device which illustrates another embodiment according to the invention.

Advantageously, as illustrated in FIG. 6, the cowling has shapes corresponding to those of an aeroplane mockup 56 so as to strengthen the intuitive character of the attitude indicator device 30. In this case, the sphere 54 may suggest the terrestrial globe.

Preferably, the attitude indicator device 30 comprises at least one luminous element with a luminous intensity and/or a colour which varies as a function of a signal, of an alarm or of a parameter of the aeroplane. According to one embodiment, the luminous intensity and/or the colour change when the trim $\theta$ and/or the bank $\Phi$ exceeds a given threshold. By way of example, the rod 32 and/or the moving body 54 comprises a luminous element which is blue when the trim $\theta$ and the bank $\Phi$ are less than a given threshold and which becomes red when the trim $\theta$ or the bank $\Phi$ exceeds the given threshold. As a variant, the colour and/or the intensity vary gradually as a function of the value of the trim $\theta$ and/or of the bank $\Phi$.

According to another embodiment, the luminous intensity and/or the colour vary as a function of the vertical speed of the aeroplane which corresponds to the component of the velocity of the aeroplane parallel to the $Z_0$ axis of the earth frame of reference.

According to another embodiment, the luminous intensity and/or the colour vary as a function of the triggering of an alarm or upon receipt of a given signal.

Figure 5:
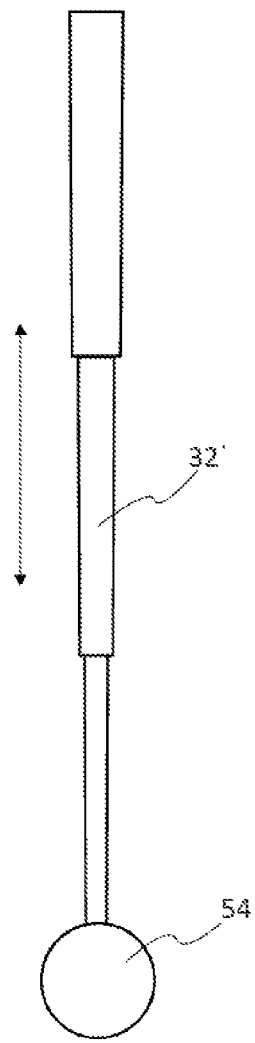
FIG. 5 is a schematic representation of an attitude indicator device which illustrates another embodiment of the invention.

According to one embodiment illustrated in FIG. 5, the rod 32' of an attitude indicator device 30 is telescopic and an actuator is devised to control the length of the telescopic rod 32' as a function of a parameter of the aeroplane other than its attitude. Thus, the length of the telescopic rod 32' varies as a function of the vertical speed of the aeroplane. For this purpose, the actuator for controlling the length of the telescopic rod 32' is piloted by a piloting system advised by at least one sensor for measuring the vertical speed of the aeroplane or a computer.

In the aeroplane cockpit 10, the attitude indicator device 30 is positioned in the field of vision of the pilot when the latter is at his piloting station 14 and is looking straight ahead.

The pilot's field of vision when he is looking straight ahead comprises a central field of vision, delimited by a dashed line 58, 58' for each piloting station 14, 14' in FIG. 1, and a peripheral field of vision situated outside the central field of vision.

The central field of vision forms a cone with an angle of the order of 60° and corresponds to the binocular vision zone.

Generally, the artificial horizon 20 is positioned in the central field of vision.

Advantageously, the attitude indicator device 30 is positioned in a cockpit zone situated in a peripheral field of vision of a pilot who is installed in a piloting station and who is looking straight ahead. This setup is favoured since it allows better perception of the motions and of the spatial orientation. The pilot thus perceives the direction indicated by this device, even if he does not consult it consciously. Moreover, this setup avoids disturbing the pilot's vision in regard to the instruments or the exterior.

Consequently, the act of disposing the attitude indicator device 30 in the peripheral field of vision can help to limit the risks of spatial disorientation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An attitude indicator device of an aeroplane, the device comprising:
    a mobile rod comprising a first end connected by a link to a support fastened to the aeroplane and a second end to which is connected a moving body;
    at least one actuator for controlling the motions of the rod;
    a system for piloting said at least one actuator as a function of information originating from an attitude detection system of the aeroplane, so as to orient the rod in a vertical direction,
    wherein the assembly of rod and moving body correspond to a pendulum-like artefact.

2. The attitude indicator device of an aeroplane according to claim 1, further comprising at least one luminous element with at least one of a luminous intensity and a colour which varies as a function of a signal, of an alarm or of a parameter of the aeroplane.

3. The attitude indicator device of an aeroplane according to claim 2, wherein the at least one of the luminous intensity and the colour change when the aeroplane has at least one of a trim and a bank exceeding a given threshold.

4. The attitude indicator device of an aeroplane according to claim 2, wherein the at least one of the luminous intensity and the colour vary as a function of the vertical speed of the aeroplane.

5. The attitude indicator device of an aeroplane according to claim 1, wherein the mobile rod is telescopic and wherein the attitude indicator device comprises an actuator for controlling the length of the telescopic rod as a function of a parameter of the aeroplane.

6. The attitude indicator device of an aeroplane according to claim 5, wherein the length of the telescopic rod varies as a function of the vertical speed of the aeroplane.

7. The attitude indicator device of an aeroplane according to claim 1, further comprising a cowling in the form of an aeroplane mockup.

8. The attitude indicator device of an aeroplane according to claim 1, wherein the link comprises:
    a first pivoting axis parallel to an aeroplane longitudinal axis ($X_1$) which pivots on itself with respect to an intermediate support;
    a first actuator configured to control a pivoting motion of the first pivoting axis;
    a second pivoting axis parallel to an aeroplane transverse axis ($Y_1$) which pivots on itself with respect to the support;
    a second actuator configured to control a pivoting motion of the second pivoting axis;
    wherein the intermediate support is fastened to the second pivoting axis.

9. An aeroplane cockpit comprising an attitude indicator device comprising:
    a mobile rod comprising a first end connected by a link to a support fastened to the aeroplane and a second end to which is connected a moving body;
    at least one actuator for controlling the motions of the rod;
    a system for piloting said at least one actuator as a function of information originating from an attitude detection system of the aeroplane, so as to orient the rod in a vertical direction,
    wherein the assembly of rod and moving body correspond to a pendulum-like artefact, and
    wherein the attitude indicator device is positioned in a cockpit zone situated in a peripheral field of vision of a pilot who is installed in a piloting station and who is looking straight ahead.

* * * * *